Feb. 29, 1944.                O. R. SIMMONS                2,343,030
                      MEANS FOR MEASURING VISCOSITY
                          Filed Aug. 12, 1941
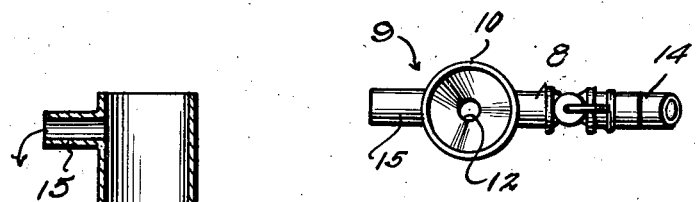
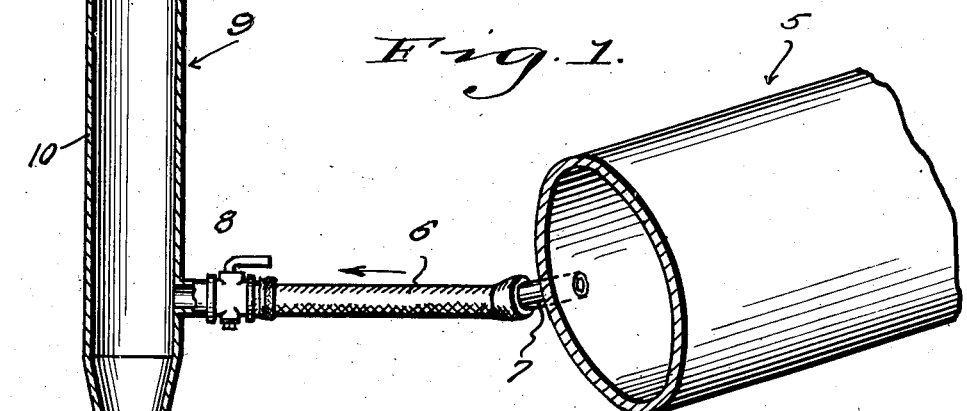
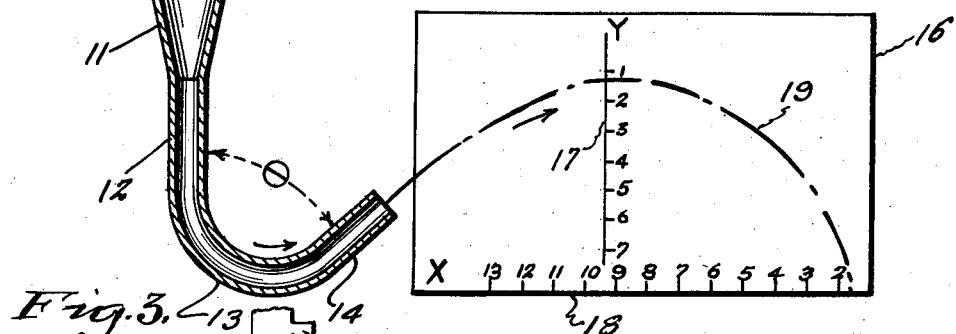
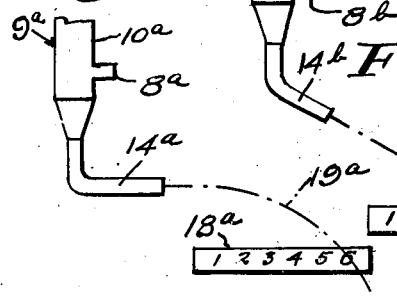
Inventor
Odys R Simmons
By Clarence A O'Brien
Attorney Patented Feb. 29, 1944

2,343,030

UNITED STATES PATENT OFFICE 2,343,030

MEANS FOR MEASURING VISCOSITY

Odys R. Simmons, Vivian, La.

Application August 12, 1941, Serial No. 406,559

3 Claims. (Cl. 265—11)

My invention relates to improvements in means for measuring viscosity of fluids, and particularly to improved procedure and apparatus for continuously indicating the viscosity of fluids, like crude oil or the like, flowing through conduits or pipes, and the primary object of my invention is to provide a simple and efficient means having practical application to oil fields and other spheres of use.

Other important objects and advantages of my invention will be apparent from a reading of the following description taken in connection with the appended drawing, wherein for purposes of illustration I have shown a preferred embodiment of the apparatus of my invention.

In the drawing:

Figure 1 is a general sectional and elevational view showing an arrangement in accordance with the present invention applied to an oil pipe line or the like.

Figure 2 is a top plan view.

Figure 3 is a fragmentary side view of another form of the invention.

Figure 4 is a fragmentary side view of a still further form of the invention.

Referring in detail to the drawing, the numeral 5 generally designates an oil pipe line or other conduit through which the fluid whose viscosity is to be continuously measured flows, and with which a hose or pipe 6 is connected, as by insertion through the side thereof of a fitting connected to one end of the hose. The opposite end of the hose 6 is connected in communication with a lateral horizontal valved fitting 8 on the metering device which is generally designated 9 and which consists of a vertically elongated substantially cylindrical tube 10 which has its lower end portion frusto-conically tapered as indicated by the numeral 11, with the small end thereof terminating in a substantially uniform diameter vertical tube 12 which terminates at its lower end, in this instance, in a substantially regularly laterally and upwardly curved portion 13 whose upper end terminates in a substantially straight inclined portion 14, the portion 14 forming the fluid outlet being inclined at a predetermined angle $\theta$. This upward inclination of the tube 14 is preferred to the horizontal arrangement of Figure 3 or the declining arrangement of Figure 4, since the inclined arrangement causes the liquid to first rise and then fall relative to the scales and thereby gives a more pronounced reading relative to the scales. The valved fitting 8 through which the fluid from the pipe line or the like enters the cylinder 10 is located a short distance above the upper end of the inverted frusto-conical portion 11 as indicated in the drawing. Adjacent the upper end of the cylinder 10 but spaced slightly below the upper end thereof is a horizontal laterally projecting overflow tube 15.

The oil or other fluid entering the cylinder 10 by the fitting 8 fills the interior of the cylinder 10 and the conical portion 11 and flows through the tube portions 12, 13 and 14, while at the same time rising in the cylinder 10 to the overflow 15. The fluid thus contained flows from the overflow 15 and from the upper end of the angulated tube portion 14. Located so that the jet of fluid emerging from the tube portion 14 will pass across its face is a chart 16 on which may be located vertical and horizontal coordinates 17 and 18, respectively, either or both of which may be utilized in calculating the viscosity of the fluid by visual observation. It is obvious that a thin or relatively non-viscous fluid will be projected a greater distance and height with respect to the tube 14 than a heavy or relatively viscous fluid and that the difference in these distances indicates the difference in viscosity of the two liquids. Should one of the liquids be chosen as the standard, then the viscosities of other liquids can be expressed in terms of the standard.

In operation, the fluid entering at the fitting 8 enters at as nearly a constant rate of flow into the cylinder 10 as is possible to achieve, the size of this entrance being regulated by its valve to admit just enough fluid to cause a small overflow at the overflow tube 15, thereby affording a head of fluid of constant height for producing a constant rate of flow of the fluid from the angulated tube portion 14. Various means available in the art may be utilized to produce a constant rate of entrance of the fluid into the tube portion 14 at 8 to produce a constant rate of overflow at 15, the simplest means being the provision of the valve in the fitting 8.

In using the chart 16 to visually indicate the viscosity of the fluid emerging from the tube portion 14, the factor of air resistance to the travel of the fluid is omitted, as negligible in measurements for practical purposes. The axes 17 and 18 may be calibrated to show the velocity of the fluid in cubic centimeters per second, seconds per quart, feet per second and the like, in accordance with preference.

In using the horizontal axis 18 on the chart 16, the viscosity or the velocity, according to the scale used, is computed by noting the point on the horizontal axis at which the curve 19 representing the trajectory of the fluid intersects that axis, modified by the angle θ.

In using the vertical axis 17 the computation may be made by noting the point along the horizontal axis at which the high point in the trajectory of the curve 19 intersects the vertical axis and modifying the result by the angle θ.

Although I have shown and described herein preferred embodiments of my invention, it is to be definitely understood that I do not wish to limit the application of the invention thereto except as may be required by the scope of the subjoined claims.

Having described the invention, what is claimed as new is:

1. A device for testing the viscosity of a fluid, comprising a vertical, cylindrical container with a tapered lowered end terminating with a curved pipe having an upwardly pointing nozzle constituting an outlet, to emit and deflect a fluid stream upwardly at a predetermined angle, means to continuously filling the cylindrical portion of said container with fluid to be tested at a point near said tapered end and a lateral overflow at another point spaced from said filling means to provide a fluid head between said two points, and a vertically positioned calibrated chart in the path of said fluid stream for reading the maximum distance between points of intersection of said path and a horizontal line, thus finding the viscosity of the fluid.

2. A device for use in testing the viscosity of a fluid, said device comprising a vertical cylindrical container having a tapered lower end portion terminating in a reduced diameter cylindrical pipe providing a fluid outlet, said pipe curving laterally and upwardly at a predetermined angle to emit an initially upwardly directed stream to describe a trajectory curve, means forming a fluid entrance through the side of said cylindrical container at a point only slightly above said tapered lower end portion, means for filling said cylinder through said entrance at a constant rate of flow with the fluid whose viscosity is to be tested, a lateral overflow adjacent the upper end of said container, thus providing a constant head of fluid between said fluid overflow and outlet in the container during the viscosity test of the fluid, and a vertically positioned calibrated chart in the path of said stream and provided with vertical and horizontal scales for visibly indicating both the height and length of the trajectory curve of the emitted fluid stream.

3. A device according to claim 2 wherein said entrance is provided with an adjustable valve enabling adjusting the inflow of fluid with respect to the overflow to assure constancy of the head of the emitted stream, and wherein said pipe terminates in a relatively long, substantially straight outer end portion deflected upwardly at the said predetermined angle.

ODYS R. SIMMONS.